(12) United States Patent
Zhou et al.

(10) Patent No.: US 9,360,782 B2
(45) Date of Patent: Jun. 7, 2016

(54) TONER COMPRISED OF A SUSTAINABLE POLYESTER RESIN

(71) Applicant: Xerox Corporation, Norwalk, NY (US)

(72) Inventors: Ke Zhou, Oakville (CA); Guerino G Sacripante, Oakville (CA); Edward G Zwartz, Mississauga (CA); Cuong Vong, Hamilton (CA); Richard PN Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 175 days.

(21) Appl. No.: 14/059,840

(22) Filed: Oct. 22, 2013

(65) Prior Publication Data

US 2015/0111146 A1    Apr. 23, 2015

(51) Int. Cl.
| | | |
|---|---|---|
| *G03G 9/087* | (2006.01) | |
| *C08G 63/64* | (2006.01) | |
| *C08G 63/553* | (2006.01) | |
| *C08G 63/78* | (2006.01) | |

(52) U.S. Cl.
CPC .......... *G03G 9/08755* (2013.01); *C08G 63/553* (2013.01); *C08G 63/64* (2013.01); *C08G 63/78* (2013.01); *G03G 9/08791* (2013.01)

(58) Field of Classification Search
CPC ...................... G03G 9/08755; G03G 9/09371
USPC ......................................... 430/109.4
See application file for complete search history.

(56) References Cited

U.S. PATENT DOCUMENTS

| | | | | |
|---|---|---|---|---|
| 2013/0022905 A1* | 1/2013 | Sasaki | ............... | G03G 9/08755 430/109.4 |
| 2013/0164668 A1* | 6/2013 | Sacripante | ......... | G03G 9/08755 430/108.1 |
| 2013/0252166 A1* | 9/2013 | Yanagida | ........... | G03G 9/08755 430/109.4 |

FOREIGN PATENT DOCUMENTS

JP           60170864  A  *  9/1985

* cited by examiner

*Primary Examiner* — Christopher Rodee
(74) *Attorney, Agent, or Firm* — Marylou J. Lavoie, Esq. LLC

(57) ABSTRACT

The disclosure describes a one reactor process for making a bio-based polyester resin and the polyester polymer thereof The bio-based polymer is the product of a condensation reaction of (a) a rosin diol, (b) neopentyl glycol, (c) succinic acid, (d) an aromatic dicarboxylic acid and (e) dipropylene glycol or tripropvlene glycol, wherein the rosin diol is a reaction product between a rosin acid and a cyclic alkylene glycol and comprises only one rosin moiety. The resultant polyester resin retains thermal properties as compared to a similar resin but made using previous multi-step processes conducted in separate vessels.

20 Claims, No Drawings

TONER COMPRISED OF A SUSTAINABLE POLYESTER RESIN

FIELD

Sustainable resins are prepared by a simplified process that reduces the complexity, process dine and cost of the procedure, by forming a polyol in a reactor and adding thereto other components to make a polyester resin, which can be used to make toner.

BACKGROUND

The vast majority of polymeric materials are based on the extraction and processing of fossil fuels, a limited resource, potentially resulting in accumulation of non-degradable materials in the environment. Recently, the USDA proposed that all toners/ink have a bio-derived (or sustainable) content of at least 20%. Bio-derived resins are being developed but integration of such reagents into toner and ink remains to be resolved. (The terms, "bio-derived resin," "bio-based resin," and "sustainable resin," are used interchangeably and are meant to indicate that the resin or polyester resin is derived from or is obtained from materials or reagents that are obtained through natural sources, in contrast to materials or monomers obtained from petrochemicals or petroleum-based sources.)

A bio-derived resin that can be used in toner made by a one-pot process that reduces complexity, materials and process time is described.

SUMMARY

The instant disclosure describes a one-pot process for preparing a sustainable resin which reduces overall process time, materials and cost. Reagents are added to a reactor under conditions that enable sequential condensation reactions producing the sustainable polyester.

DETAILED DESCRIPTION

In US Publ. Nos. 20130084520, 2013000244170, 2013000744171 and 20130188986 is disclosed a process for making a bio-based resin where a biopolyol is obtained by reacting, for example, a monocarboxylic acid, such as, a rosin acid, with a polyol comprising sites reactive with a carboxylic acid residue, such as, a reactive polyglycol, for example, a poly comprising an epoxide group, such as bis-(epoxy-propyl)-neopentylene glycol. The reactions may be seen in the following scheme (A).

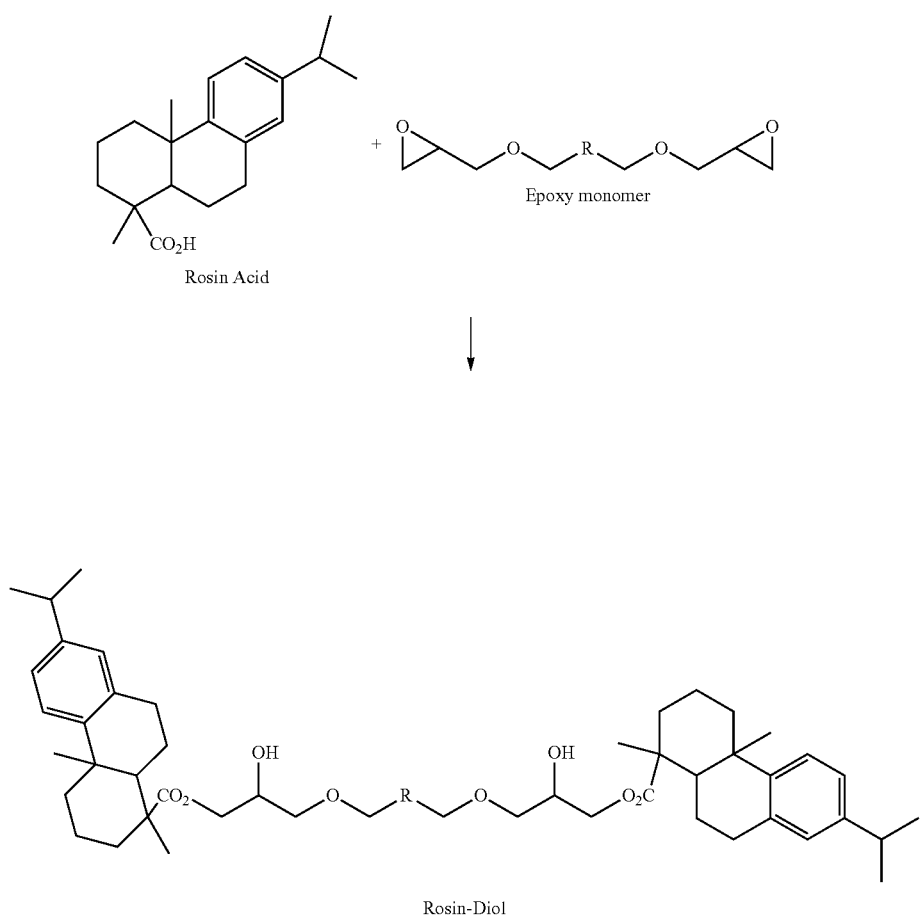

The aforementioned rosin diol then is reacted with suitable diacids and diols to result in a polyester resin.

The present disclosure provides a simplified procedure by utilizing a more economical cyclic alkylene glycol, such as, glycerine carbonate, to make a first rosin diol. The resulting rosin diol is different from the above rosin diol in containing only one rosin moiety. The reaction may be seen in the following scheme (B).

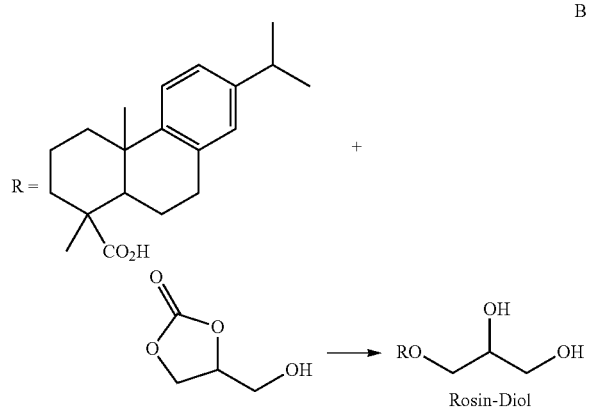

The rosin diol then is reacted with a mixture of terephthalic acid, neopentyl glycol, succinic acid and dipropylene glycol/tripropylene glycol as depicted in reaction scheme C.

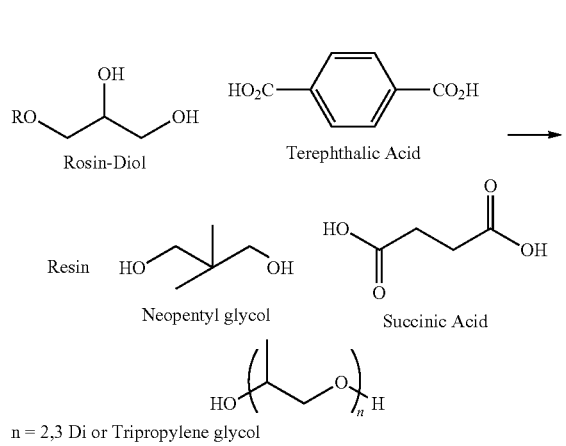

In embodiments, a process for making a bio-based polyester polymer in a single reactor is disclosed including the steps of preparing a rosin diol from the reaction products between a rosin acid and a cyclic alkylene glycol; reacting said rosin diol with neopentyl glycol, an aromatic dicarboxylic acid, succinic acid and a poly-alkoxyglycol in said reactor to form said polyester polymer; and recovering said polyester polymer, where the process is carried out at atmospheric pressure.

Unless otherwise indicated, all numbers expressing quantities and conditions, and so forth used in the specification and claims are to be understood as being modified in all instances by the term, "about." "About," is meant to indicate a variation of no mare than 10% from the stated value. Also used herein is the term, "equivalent," "similar," "essentially," "substantially," "approximating" and "matching," or grammatical variations thereof, have generally acceptable definitions or at the least, are understood to have the same meaning as, "about."

As used herein, a polymer is defined by the monomer(s) from which the polymer is made. Thus, for example, while in as polymer a terephthalic acid per se does not exist, as used herein, that polymer is said to comprise a terephthalic acid. Thus, a biopolymer made by the one-pot process disclosed herein can comprise terephthalate/terephthalic acid; succinic acid; and dehydroabietic acid. That biopolymer also can be said to comprise neopentyl glycol as that diol is used with the terephthalate/terephthalic acid and succinic acid. In addition, that biopolymer can also be said to comprise di- or tri-propylene glycol, as that glycol is also used.

As used herein, "biobased," or use of the prefix, "bio," refers to a reagent or to a product that is composed, in whole or in part, of a biological product, including plant, animal and marine materials, or derivatives thereof. Generally, a biobased or biomaterial is biodegradable, that is, substantially or completely biodegradable, by substantially is meant greater than 50%, greater than 60%, greater than 70% or more of the material is degraded from the original molecule to another form by a biological or environmental mechanism, such as, action thereon by bacteria, animals, plants, light, temperature oxygen and so on in a matter of days, matter of weeks, a year or more, but generally no longer than two years. A, "bioresin," is a resin, such as, a polyester, which contains or is composed of a biobased material in whole or in part, such as, a polyglycol, such as, polyethylene glycol and a dicarboxylic acid. Hence, the reagents can be a biopolyacid and a biopolyol. Such a resin can be described as, "sustainable."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

As used herein, a "rosin," or, "rosin product", is intended to encompass a rosin, a rosin acid, a rosin ester and so on, as well as a rosin derivative which is a rosin treated, for example, to comprise plural alcohol groups. As known in the art, rosin is a blend of at least eight monocarboxylic acids. Abietic acid can be a primary species, and the other seven acids are isomers thereof. Because of the composition of a rosin, often the synonym, "rosin acid," is used to describe various rosin-derived products. As known, rosin is not a polymer but essentially a varying blend of the eight species of carboxylic acids. A rosin product includes, as known in the art, chemically modified rosin, such as, partially or fully hydrogenated rosin acids, partially or fully dimerized rosin acids, esterified rosin acids, functionalized rosin acids or combinations thereof. Rosin is available commercially in a number of forms fin example, as a rosin acid, as a rosin ester and so on. For example, rosin acids, rosin ester and dimerized rosin are available from Eastman Chemicals under the product lines, POLY-PALE™, DYMEREX™, STAYBELITE-E™, FORAL™Ax-E, LEWISOL™ and PENTALYN™; Arizona Chemicals under the product lines, SYLVALITE™ and SYLVATAC™; and Arakawa-USA under the product lines, Pensel and Hypal.

In embodiments, the reactions as disclosed result in, in part, rosin diols, including, but not limited to, abietic diol, abietic monoglycerate, palustric diol, palustric monoglycerate, dehydroabietic diol, dehydroabietic monoglycerate, neoabietic diol, neoabietic monoglycerate levopimaric diol, levopimaric monoglycerate, pimaric diol, pimaric monoglycerate, sandaracopimaric diol, sandaracopimaric monoglycerate, isopimaric diol, isopimaric monoglycerate, hydrogenated abietic diol, hydrogenated palustric diol, hydrogenated dehydroabietic diol, hydrogenated neoabietic diol, hydrogenated levopimaric diol, hydrogenated pimaric diol, hydrogenated sandaracopimaric diol and hydrogenated isopimaric diol.

Thus, for example, a rosin acid can be reacted with a polyol, which combines at the carboxylic acid group of a rosin acid to form a joined molecule, a rosin ester. Such a reaction is known in the art and is compatible with the one-pot reaction conditions disclosed herein for producing a bioresin. A catalyst can be included in the reaction mixture to form the rosin ester. Suitable catalysts include organo amines, such as ethyl amine, butyl amine, propyl amine, aryl amines, such as imidazole, 2-methyl imidazole, pyridine, dimethylamino pyridine, organo ammonium halides such as trimethyl ammonium chloride, triethyl ammonium chloride, tributyl ammonium chloride, trimethyl ammonium bromide, triethyl ammonium bromide, tributyl ammonium bromide, trimethyl ammonium iodide, triethyl ammonium iodide, tributyl ammonium iodide, tetraethyl ammonium chloride, tetraethyl ammonium bromide, tetraethyl ammonium iodide, tetrabutyl ammonium chloride, tetrabutyl ammonium bromide, tetrabutyl ammonium iodide, organo phosphines such as triphenylphosphine, organo phosphonium halides, tetraethyl phosphonium chloride, tetraethyl phosphonium bromide, tetraethyl phosphonium iodide, tetrabutyl phosphonium chloride, tetrabutyl phosphonium bromide, tetrabutyl phosphonium iodide, and so on. The reaction can be conducted at an elevated temperature, such as, from about 100° C. to about 200° C., from about 105° C. to about 175° C., from about 110° C. to about 170° C. and so on, although temperatures outside of those ranges can be used as a design choice.

Toner Particles

A toner composition can comprise more than one form or sort of polymer, such as, two or more different polymers such as, two or more different polyester polymers composed of different monomers, where at least one of the polymers is a biopolymer or bioresin of interest. The polymer can be an alternating copolymer, a block copolymer, a graft copolymer, a branched copolymer, a crosslinked copolymer and so on.

Examples of suitable resins or polymers which may be utilized in forming a toner include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and combinations thereof, as well as other resins, as known in the art.

The toner particle can include other optional reagents, such as, a surfactant, a wax, a shell and so on. The toner composition optionally can comprise inert particles, which can serve as toner particle carriers, which can comprise the resin taught herein. The inert particles can be modified, for example, to serve a particular function. Hence, the surface thereof can be derivatized or the particles can be manufactured for a desired purpose, for example, to carry a charge or to possess a magnetic field. The toner particles can comprise one or more colorants.

The discussion below is directed to polyester resins.

A. Components

1. Resin

The biopolyester of interest is used alone or in combination with one or more other known resins used in toner.

One, two or more polymers in addition to a biopolymer of interest may be used in forming a toner or toner particle. When two or more polymers are used, the polymers may be in any suitable ratio (e.g., weight ratio) such as, for instance, with two different polymers, from about 1% (first biopolymer)/99% (second polymer) to about 99% (first biopolymer)/1% (second polymer), in embodiments from about 10% (first biopolymer)/90% (second polymer) to about 90% (first biopolymer)/10% (second polymer) and so on, as a design choice. For example, a toner can comprise two forms of amorphous polyester resins, one of which is a biopolymer of interest, and a crystalline resin in relative amounts as a design choice.

The biopolymer may be present in an amount of from about 25 to about 95% by weight, from about 35 to about 85% by weight of toner particles on a solids basis.

a. Polyester Resins

Suitable polyester resins include, for example, those which are sulfonated, non-sulfonated, crystalline, amorphous, combinations thereof and the like. The polyester resins may be linear, branched, crosslinked, combinations thereof and the like.

When a mixture is used, such as, amorphous and crystalline polyester resins, the ratio of crystalline polyester resin to amorphous polyester resin can be in the range from about 1:99 to about 30:70 from about 5:95 to about 25:75; in embodiments, from about 5:95 to about 15:95.

A polyester resin may be obtained synthetically, for example, in an esterification reaction involving a reagent comprising a carboxylic acid or ester group and another reagent comprising an alcohol. In embodiments, the alcohol reagent comprises two or more hydroxyl groups, in embodiments, three or more hydroxyl groups. In embodiments, the acid comprises two or more carboxylic acid or ester groups, in embodiments, three or more carboxylic acid or ester groups. Reagents comprising three or more functional groups enable, promote or enable and promote polymer branching and crosslinking. In embodiments, a polymer backbone or a polymer branch comprises at least one monomer unit comprising at least one pendant group or side group, that is, the monomer reactant from which the unit was obtained comprises at least three functional groups.

Examples of polyacids or polyesters, which may be a bioacid or a bioester, that can be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The polyacid or polyester reagent may be present, for example, in an amount from about 40 to about 60 mole % of the resin, from about 42 to about 52 mole % of the resin, from about 45 to about 50 mole % of the resin, irrespective of the number of species of acid or ester monomers used.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, dodecanediol, 1,4-cyclohexanedimethanol, 1,3-cyclohexanedimethanol, heptanediol, xylenedimethanol, cyclohexanediol, diethylene glycol, bis(2-hydroxyethyl) oxide, dipropylene glycol, dibutylene glycol, and combinations thereof. The amount of polyol can vary, and may be present, for example, in an amount from about 40 to about 60 mole % of the resin, from about 42 to about 55 mole % of the resin, from about 45 to about 53 mole % of the resin, and a second polyol, can be used in an amount from about 0.1 to about 10 mole %, from about 1 to about 4 mole % of the resin.

For forming a crystalline polyester resin, suitable polyols include aliphatic polyols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfoaliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like, including structural isomers thereof. The aliphatic polyol may be, for example, selected in an amount from about 40 to about 60 mole %, from about 42 to about 55 mole %, from about 45 to about 53 mole %, and a second polyol, can be used in an amount from about 0.1 to about 10 mole %, from about 1 to about 4 mole % of the resin.

Examples of polyacid or polyester reagents for preparing a crystalline resin include oxalic acid, succinic acid, elutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof. The polyacid may be selected in an amount of, for example, in embodiments from about 40 to about 60 mole %, from about 42 to about 52 mole %, from about 45 to about 50 mole %, and optionally, a second polyacid can be selected in an amount from about 0.1 to about 10 mole % of the resin.

Specific crystalline resins that can be used include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-decanoate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate) and copoly(2,2-dimethylpropane-1,3-diol-decanoate)-copoly(ethylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

Suitable crystalline resins which may be utilized, optionally in combination with an amorphous resin as described above, include those disclosed in U.S. Pub. No. 2006/0222991, the disclosure of which is hereby incorporated by reference in entirety.

A suitable crystalline resin may include a resin of 1,9-nonanediol and dodecanedioic acid.

The crystalline resin may be present, for example, in an amount from about 1 to about 85% by weight of the toner components, from about 2 to about 50% by weight of the toner components, from about 5 to about 15% by weight of the toner components. The crystalline resin can possess various melting points of, for example, from about 30° C. to about 120° C., from about 50° C. to about 90° C., from about 60° C. to about 80° C. The crystalline resin may have a number average molecular weight ($M_n$), as measured by gel permeation chromatography (GPC) of, for example, from about 1,000 to about 50,000, from about 2,000 to about 25,000, and a weight average molecular weight ($M_w$) of, for example, from about 2,000 to about 100,000, from about 3,000 to about 80,000, as determined by GPC. The molecular weight distribution ($M_w/M_n$) of the crystalline resin may be, for example, from about 2 to about 6, from about 3 to about 4.

b. Esterification Catalyst

Condensation catalysts may be used in the polyester reaction and include tetraalkyl titanates; dialkyltin oxides, such as, dibutyltin oxide; tetraalkyltins, such as, dibutyltin dilaurate; dibutyltin diacetate; dibutyltin oxide; dialkyltin oxide hydroxides, such as, butyltin oxide hydroxide; aluminum alkoxides, alkyl zinc, dialkyl zinc, zinc oxide, stannous oxide, stannous chloride, butylstannoic acid, or combinations thereof.

Such catalysts may be used in amounts of, for example, from about 0.01 mole % to about 5 mole % based on the amount of starting polyacid, polyol or polyester reagent in the reaction mixture.

Generally, as known in the art, the polyacid/polyester and polyols reagents, are mixed together, optionally with a catalyst, and incubated at an elevated temperature, such as, from about 130° C. or more, from about 140° C. or more, from about 150° C. or more, and so on, although temperatures outside of those ranges can be used to enable esterification to occur until equilibrium, which generally yields water or an alcohol, such as, methanol, arising from forming the ester bonds in esterification reactions. The reaction can be conducted under vacuum to promote polymerization.

c. Branching/Crosslinking

Branching agents can be used, and include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, 1,2,7,8-octanetetracarboxylic acid, acid anhydrides thereof, lower alkyl esters thereof and so on. The branching agent can be used in an amount from about 0.01 to about 10 mole % of the resin, from about 0.05 to about 8 mole % or from about 0.1 to about 5 mole % of the resin.

Hence, suitable polyacids/polyesters and polyols, which may be biodegradable, are combined under suitable conditions as known in the art, for example, at room temperature, or at an elevated temperature, under atmospheric conditions or under reduced or elevated pressure as known in the art and as a design choice. The esterification reaction produces water or an alcohol byproduct, which can be removed practicing known materials and methods, such as, distillation.

Accordingly, disclosed herein is one-pot reaction for producing a biopolyester resin suitable for use in an imaging toner. A biopolyester resin is produced and processed to form a polymer reagent, which can be dried and formed into flowable particles, such as, a pellet, a powder and the like. The polymer reagent then can be incorporated with, for example, other reagents suitable for making a toner particle, such as, a colorant and/or a wax, and processed in a known manner to produce toner particles.

Polyester resins suitable for use in an imaging device can carry one or more properties, such as, a $T_g$(onset) of at least about 40° C., at least about 45° C., at least about 50° C., at least about 55° C.; a $T_g$ of at least about 110° C., at least about 115° C., at least about 120° C., at least about 125° C.; an acid value (AV) of at least about 10, at least about 12.5, at least about 15, at least about 17.5; and an $M_w$ of at least 5000, at least about 15,000, at least about 20,000, at least about 100,000.

2. Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP-604™ and NP-608™; Magnox magnetites, TMB-100™ or TMB-104™; and the like.

Colored pigments, such as, cyan, magenta, yellow, red, orange, green, brown, blue or mixtures thereof can be used. The additional pigment or pigments can be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 48™, LEMON CHROME YELLOW DCC 1026™, TOLUIDINE RED™ and BON RED C™ available from Dominion Color Corporation., Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color index as CI 60710, CI Dispersed Red 15, a diazo dye identified in the Color Index as CI 26050, CI Solvent Red 19 and the like.

Illustrative examples of cyan pigments include copper tetra (octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants can be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BUD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF) Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RE (Ciba-Geigy), Paliogen Red 3871K (BASF), Paliogen Red 3340 (BASF), Lithol Fast Scarlet L4300 (BASF), combinations of the foregoing, and the like. Other pigments that can be used, and which are commercially available, include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from 0% to about 35% by weight of the toner particles on a solids basis, from about 5% to about 25% by weight, from about 5% to about 15% by weight.

More than one colorant may be present in a toner particle. For example, two colorants may be present in a toner particle, such as, a first colorant of pigment blue, may be present in an amount ranging from about 2% to about 10% by weight of the toner particle on a solids basis, from about 3% to about by weight, from about 5% to about 10% by weight; with a second colorant of pigment yellow that may be present in an amount ranging from about 5% to about 20% by weight of the toner particle on a solids basis, from about 6% to about 15% by weight, from about 10% to about 20% by weight and so on.

3. Optional Components a. Surfactants

Toner compositions or reagents therefor may be in dispersions including a surfactant. Emulsion aggregation methods where the polymer and other components of the toner are in combination can employ one or more surfactants to form an emulsion.

One two or more surfactants may be used. The surfactants may be selected from ionic surfactants and nonionic surfactants, or combinations thereof. Anionic surfactants and cationic surfactants are encompassed by the term, "ionic surfactants."

In embodiments, the surfactant or the total amount of surfactants may be used in an amount of from about 0.01 to about 5% by weight of the toner-forming composition, for example, from about 0.75% to about 4% by weight of the toner-forming composition, in embodiments, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PRF 108; and a DOWFAX, available from The Dow Chemical Corp.

Anionic surfactants include sulfates and sulfonates, such as, sodium dodecylsulfate (SDs), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonia bromide, heuzaikonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

b. Waxes

The toners of the instant disclosure, optionally, may contain a wax, which can be either a single type of wax or a mixture of two or more different types of waxes (hereinafter identified as, "a wax"). A wax can be added to a toner formulation or to a developer formulation, for example, to improve particular toner properties, such as, toner particle shape, charging, fusing characteristics, gloss, stripping, offset properties and the like. Alternatively, a combination of waxes can be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, in embodiments, from about 1,000 to about 10,000. Waxes that may be used include, for example, polyolefins, such as, polyethylene, polypropylene and polybutene waxes, such as, those that are commercially available, for example. POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K. K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetatstearate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

c. Aggregating Factor

An aggregating factor (or coagulant) may be used to facilitate growth of the nascent toner particles and may be an inorganic cationic coagulant, such as for example, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides.

The aggregating factor may also contain minor amounts of other components, for example, nitric acid.

The aggregating factor may be present in an emulsion in an amount of from, for example, from about 0 to about 10 wt %, or from about 0.05 to about 5 wt % based on the total solids in the toner.

In embodiments, a sequestering agent or chelating agent may be introduced after aggregation is complete to contribute to pH adjustment and/or to sequester or to extract a metal complexing ion, such as, aluminum, from the aggregation process. Thus, the sequestering, chelating, or complexing agent used after aggregation is complete may comprise an organic complexing component, such as, ethylenediaminetetraacetic acid (EDTA), gluconal, hydroxyl-2,2' iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyaspartic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof.

d. Surface Additive

The toner particles can be mixed with one or more of silicon dioxide or silica ($SiO_2$), titania or titanium dioxide ($TiO_2$) and/or cerium oxide, among other additives. Silica may be a first silica and a second silica. The first silica may have an average primary particle size, measured in diameter, in the range of from about 5 nm to about 50 nm, from about 5 nm to about 25 nm, from about 20 nm to about 40 nm. The second silica may have an average primary particle size, measured in diameter, in the range of from about 100 nm to about 200 nm, from about 100 nm to about 150 nm, from about 125 nm to about 145 nm. The second silica may have a larger average size (diameter) than the first silica. The titania may have an average primary particle size in the range of from about 5 nm to about 50 nm, from about 5 nm to about 20 nm, from about 10 nm to about 50 nm. The cerium oxide may have an average primary particle size in the range of, for example, about 5 nm to about 50 nm, from about 5 nm to about 20 nm, from about 10 nm to about 50 nm.

Zinc stearate also may be used as an external additive. Calcium stearate and magnesium stearate may provide similar functions. Zinc stearate may have an average primary particle size in the range of from about 500 nm to about 700 nm, from about 500 nm to about 600 nm, from about 550 nm to about 650 nm.

B. Toner Particle Preparation

The toner particles may be prepared by any method within the purview of one skilled in the art, for example, any of the emulsion/aggregation methods can be used with a polyester resin. However, any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticies or microparticles; and so on.

In embodiments relating to an emulsification/aggregation process, a resin, for example, made as described above, can be dissolved in a solvent, and can be mixed into an emulsion medium, for example water, such as, deionized water (DIW), optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer can be present in amounts of from about 0.1% to about 5%, from about 0.5% to about 3% by weight of the resin. When such salts are added to the composition as a stabilizer, in embodiments, incompatible metal salts are not present in the composition, for example, a composition can be completely or essentially free of zinc and other incompatible metal ions, for example, Ca, Fe, Ba etc., that form water-insoluble salts. The stabilizer can be added to the mixture at ambient temperature, or can be heated to the mixture temperature prior to addition.

Following emulsification, toner compositions may be prepared by aggregating a mixture of a resin, an optional colorant, an optional wax and any other desired additives in an emulsion, optionally, with surfactants as described above, and then optionally coalescing the aggregated particles in the mixture. A mixture may be prepared by adding an optional wax or other materials, which optionally also may be in a dispersion, including a surfactant, to the emulsion comprising a resin-forming material or a resin. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing can be at front about 600 to about 4,000 rpm. Homogenization in be by any suitable means, including, for example, IKA ULTRA TURRAX T50 probe homogenizer.

Following preparation of the above mixture, larger particles or aggregates, often sized in micrometers, of the smaller particles from the initial polymerization reaction, often sized in nanometers, are obtained. An aggregating agent may be added to the mixture to facilitate the process. Suitable aggregating factors or agents include, for example, aqueous solutions of a divalent cation, a multivalent cation or a compound comprising same.

The aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, from about 0.25 pph to about 0.75 pph.

To control aggregation of the particles, the aggregating factor may be metered into the mixture over time. For example, the factor may be added incrementally into the mixture over a period of from about 5 to about 240 minutes, from about 30 to about 200 minutes.

Addition of the aggregating factor also may be done while the mixture is maintained under stirred conditions, in embodiments, from about 50 rpm to about 1,000 rpm, from about 100 rpm to about 500 rpm; and at a temperature that is below the $T_g$ of the resin or polymer, from about 30° C. to about 90° C., from about 35° C. to about 70° C., The growth and shaping of the particles following addition of the aggregation factor may be accomplished under any suitable condition(s).

The particles may be permitted to aggregate until a predetermined desired particle size is obtained. Particle size is monitored during the growth process, for example, with a COULTER COUNTER, for average particle size. The aggregation thus may proceed by maintaining the mixture, for example, at elevated temperature, or slowly raising the temperature, for example, from about 40° C. to about 100° C. and holding the mixture at that temperature for from about 0.5 hours to about 6 hours, from about hour 1 to about 5 hours, while maintaining stirring, to provide the desired aggregated particles. Once the predetermined desired particle size is attained, the growth process is halted.

Once the desired final size of the toner particles or aggregates is achieved, the pH of the mixture may be adjusted with base to a value of from about 5 to about 10, in embodiments, from about 6 to about 8. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, a chelator, such as, EDTA, may be added to assist adjusting the pH to the desired value.

The base may be added in amounts from about 2 to about 25% by weight of the mixture, in embodiments, from about 4 to about 10% by weight of the mixture. Following aggregation to the desired particle size, with the formation of an optional shell as described above, the particles then may be coalesced to the desired final shape, the coalescence being achieved by, for example, heating the mixture to a temperature of from about 55° C. to about 100° C., in embodiments, from about 65° C. to about 75° C., in embodiments, about 70° C., which may be below the melting point of the resin or polymer(s) to prevent plasticization. Higher or lower temperatures may be used it being understood that the temperature is a function of the polymer(s) used for the core and/or shell.

The aggregate particles may be of a size of less than about 3 μm, from about 2 μm to about 3 μm, but larger particle sizes can be used.

After aggregation, but prior to coalescence, a resin coating may be applied to the aggregated particles to form a shell there over. The shell can comprise any resin described herein or as known in the art. In embodiments, a polyester amorphous resin latex as described herein may be included in the shell. In embodiments, a polyester anion resin latex described herein may be combined with a different resin, and then added to the particles as a resin coating to form a shell.

A shell resin may be applied to the aggregated particles by any method within the purview of those skilled in the art. The emulsion possessing the resins may be combined with the aggregated particles so that the shell forms over the aggregated particles.

The formation of the shell over the aggregated particles may occur while heating to a temperature from about 30° C. to about 80° C., from about 35° C. to about 70° C. The formation of the shell may take place for a period of time from about 5 minutes to about 10 hours, from about 10 minutes to about 5 hours.

The shell may be present in an amount from about by weight to about 80% by weight of the toner components, from about 10% by weight to about 40% by weight of the toner components, from about 20% by weight to about 35% by weight of the toner components.

Following aggregation to a desired particle site and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C. from about 55° C. to about 99° C., which may be at or above the $T_g$ of the resins used to form the toner particles, and/or reducing the stirring, for example, from about 1000 rpm to about 100 rpm, from about 800 rpm to about 200 rpm. Coalescence may be conducted over a period from about 0.01 to about 9 hours, in embodiments from about 0.1 to about 4 hours, see, for example, U.S. Pat. No. 7,736,831.

Optionally, a coalescing agent can be used. Examples of suitable coalescence agents include, but are not limited to, benzoic acid alkyl esters, ester alcohols, glycol/ether-type solvents, long chain aliphatic alcohols, aromatic alcohols, mixtures thereof and the like.

The coalescence agent (or coalescing agent or coalescence aid agent) can evaporate during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent can be added prior to the coalescence or fusing step in any desired or suitable amount. For example, the coalescence agent can be added in an amount of from about 0.01 to about 10% by weight, based on the solids content in the reaction medium, or from about 0.05, or from about 0.1%, to about 0.5 or to about 3.0% by weight, based on the solids content in the reaction medium. Of course, amounts outside those ranges can be used, as desired.

Coalescence may proceed and be accomplished over a period of from about 0.1 to about 9 hours, from about 0.5 to about 4 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze dying.

The toner particles also may contain other optional additives.

The toner may include any known charge additives in amounts of from about 0.1 to about 10 weight %, from about 0.5 to about 7 weight % of the toner. Examples of such charge additives include alkyl pyridinium halides, bisulfates, the charge control additives of U.S. Pat. Nos. 3,944,493; 4,007,293, 4,079,014; 4,394,430; and 4,560,635, the disclosure of each of which hereby is incorporated by reference in entirety, negative charge enhancing additives, such as, aluminum complexes, and the like.

Charge enhancing molecules can be used to impart either a positive or a negative charge on a toner particle. Examples include quaternary ammonium compounds, see, for example, U.S. Pat. No. 4,298,672, organic sulfate and sulfonate compounds, see for example. U.S. Pat. No. 4,338,390, cetyl pyridinium tetrafluoroborates, distearyl dimethyl ammonium methyl sulfate, aluminum salts and so on.

Surface additives can be added to the toner compositions of the present disclosure, for example, after washing or drying. Examples of such surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which hereby is incorporated by reference in entirety.

Surface additives may be used in an amount of from about 0.1 to about 10 wt %, from about 0.5 to about 7 wt % of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosure of each of which hereby is incorporated by reference in entirety, also can be present. The additive can be present in an amount of from about 0.05 to about 5%, and in embodiments, of from about 0.1 to about 2% of the toner, which additives can be added during the aggregation or blended into the formed toner product.

The gloss of a toner may be influenced by the amount of retained metal ion, such as. $Al^{3+}$, in a particle. The amount of retained metal ion may be adjusted further by the addition of a chelator, such as, EDTA. In embodiments, the amount of retained catalyst, for example, $Al^{3+}$, in toner particles may be from about 0.1 pph to about 1 pph, from about 0.25 pph to about 0.8 pph. The gloss level of a toner of the instant disclosure may have a gloss, as measured by Gardner gloss units (gu), of from about 20 gu to about 100 gu, from about 50 gu to about 95 gu, from about 60 gu to about 90 gu.

Hence, a particle can contain at the surface one or more silicas, one or more metal oxides, such as a titanium oxide and a cerium oxide, a lubricant, such as, a zinc stearate and so on. In some embodiments, a particle surface can comprise two silicas, two metal oxides, such as, titanium oxide and cerium oxide, and a lubricant, such as, a zinc stearate. All of those surface components can comprise about 5 % by weight of as toner particle weight. There can also be blended with the toner compositions, external, additive particles including flow aid additives, which additives may be present on the surface of the toner particles. Examples of these additives include metal oxides like titanium oxide, tin oxide, mixtures thereof, and the like; colloidal silicas, such as AEROSIL®, metal salts and metal salts of fatty acids, including zinc stearate, aluminum oxides, cerium oxides, and mixtures thereof. Each of the external additives may be present in embodiments in amounts of from about 0.1 to about 5 wt %, or from about 0.1 to about 1 wt %, of the toner. Several of the aforementioned additives are illustrated in U.S. Pat. Nos. 3,590,000, 3,800,588, and 6,214,507, the disclosure of each of which is incorporated herein by reference.

Toners may possess suitable charge characteristics when exposed to extreme relative humidity (RH) conditions. The low humidity zone (C zone) may be about 10° C. and 15% RH, while the high humidity zone (A zone) may be about 28° C. and 85% RH.

Toners of the instant disclosure also may possess a parent toner charge per mass ratio (q/m) of from about −5 µC/g to about −90 µC/g, and a final toner charge after surface additive blending of from about −15 µC/g to about −80 µC/g.

Other desirable characteristics of a toner include storage stability, particle size integrity, high rate of fusing to the substrate or receiving member, sufficient release of the image from the photoreceptor, nondocument offset, use of smaller-sized particles and so on, and such characteristics can be obtained by including suitable reagents, suitable additives or both, and/or preparing the toner with particular protocols.

The characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

The dry toner particles, exclusive of external surface additives, may have the following characteristics: (1) volume average diameter (also referred to as "volume average particle diameter") of from about 2.5 to about 20 µm, from about 2.75 to about 10 µm from about 3 to about 7.5 µm; (2) number average geometric standard deviation (GSDn) and/or volume average geometric standard deviation (GSDv) of from about 1.18 to about 1.30, from about 1.21 to about 1.24; and (3) circularity of from about 0.9 to about 1.0 (measured with, for example, a Sysmex FPIA 2100 analyzer), from about 0.95 to about 0.985, from about 0.96 to about 0.98.

Developers

The toner particles thus formed may be formulated into a developer composition. For example, the toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer, with the remainder of the developer composition being the carrier. However, different toner and carrier percentages may be used to achieve a developer composition with desired characteristics.

1. Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

The carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 wt % to about 70 to about 30 wt %, in embodiments, from about 40 to about 60 wt %. A to about 60 to about 40 wt %. The coating may have a coating weight of, for example, from about 0.1 to about 5% by weight of the carrier, from about 0.5 to about 2% by weight of the carrier.

In embodiments, PMMA, for example, may be copolymerized with any desired monomer, so long as the resulting copolymer retains a suitable particle size. Suitable monomers include monoalkyl or dialkyl amines, such as, a dimethylaminoethyl methacrylate, diethylaminoethyl methacrylate, diisopropylaminoethyl methacrylate, butylaminoethyl methacrylate and the like.

Various effective suitable means can be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to these to the carrier core. The coated carrier particles then may be cooled and thereafter classified to a desired particle size.

The carrier particles may be prepared by mixing the carrier core with polymer in an amount from about 0.05 to about 10% by weight, in embodiments, from about 0.01 to about 3% by weight, based on the weight of the coated carrier particle, until adherence thereof to the carrier core is obtained, for example, by mechanical impaction and/or electrostatic attraction.

In embodiments, suitable carriers may include a steel core, for example, of from about 25 to about 100 μm in size, in embodiments, from about 50 to about 75 μm in size, coated with about 0.5% to about 10% by weight, in embodiments, from about 0.7% to about 5% by weight of a polymer mixture including, for example, methylacrylate and carbon black, using the process described, for example, in U.S. Pat. Nos. 5,236,629 and 5,330,874.

Devices Comprising a Toner Particle

Toners and developers can be combined with a number of devices ranging from enclosures or vessels, such as, to vial, a bottle, to flexible container, such as a bag or a package, and so on, to devices that serve more than a storage function.

A. Imaging Device Components

The toner compositions and developers of interest can be incorporated into devices dedicated, for example, to delivering same for a purpose, such as, forming an image. Hence, particularized toner delivery devices are known, see, for example, U.S. Pat. No. 7,822,370, and can contain a toner preparation or developer of interest. Such devices include cartridges, tanks, reservoirs and the like, and can be replaceable, disposable or reusable. Such a device can comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

B. Toner or Developer Delivery Device

A toner or developer of interest may be included in as device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

Imaging Devices

The toners or developers can be used for electostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Imaging processes include, for example, preparing an image with an electrophotographic device including, for example, one or more of a charging component, an imaging component, a photoconductive component, a developing component, a transfer component, a fusing component and so on. The electrophotographic device may include a high speed printer, a color printer and the like.

Once the image is formed with toners/developers via a suitable image development method, such as any of the aforementioned methods, the image then may be transferred to an image receiving medium or substrate, such as, a paper and the like. In embodiments, the fusing member or component, which can be of any desired or suitable configuration, such as, a drum or roller, as belt or web, a flat surface or platen, or the like, may be used to set the toner image on the substrate. Optionally, a layer of a liquid, such as, a fuser oil can be applied to the fuser member prior to fusing.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, "room temperature," (RT) refers to a temperature of from about 20° C. to about 30° C.

EXAMPLES

Example 1

Synthesis of Bio-Based Resins

To a 1-L Buchi reactor were added a rosin comprised primarily of dehydroabietic acid (195.7 g), glycerine carbonate (83.4 g) and tetraethyl ammonium bromide catalyst (1.63g). The mixture was heated to 170° C. and maintained for 9 hours until the acid value was less than 1 mgKOH/kg. To that mixture then were added neopentyl glycol (63.9 g), dipropylene glycol (47.4 g), tripropylene glycol (28.3 g), terephthalic acid (215.8 g), succinic add (20.85 g) and FASCAT 4100 catalyst (2.0 g). The mixture was heated from 165° C. to 205° C. over a 5 hour period and maintained overnight, followed by increasing the temperature to 215° C. until a softening point of between 113° C. and 123° C. was obtained (see Table 1). HMW is higher molecular weight and LMW is lower molecular weight.

TABLE 1

Thermal Properties of the Bio-Based Resins

| Resin | Ts | AV | Tg |
|---|---|---|---|
| 1 (HMW) | 122.7 | 17.33 | 58.49 |
| 2 (LMW) | 113.5 | 10.31 | 53.13 |

Example 2

Toner Made with Resin 1.9% Wax and 6.8% Crystalline Resin (CPE)

Into a 2 liter glass reactor equipped with an overhead mixer were added 307.58 g emulsion of resin 1 (19.78 wt %) prepared by a standard phase inversion emulsion (PIE) process (particle site of 120.6 μm), 23.38 g CPE (35.60 wt %), 36.94 g IGI wax dispersion (29.97 wt %) and 48.09 g cyan pigment PB 15:3 (14.96 wt %). Separately 1.11 g $Al_2(SO_4)_3$ (27.85 wt %) were added as the flocculent (aggregating agent) under homogenization. The mixture was heated to 46.4° C. to aggregate the particles while stirring at 300 rpm. The particle size was monitored with a COULTER COUNTER until the core particles reached a volume average particle size of 41.7 μm with a $GSD_v$ of 1.25, and then 169.87 g of above mentioned resin 1 emulsion were added as shell material. resulting in core-shell structured particles with an average particle size of 5.65 µm, $GSD_v$ of 1.25. Thereafter, the pH of the reaction slurry was increased to 7.8 using a 4 wt % NaOH solution followed by 4.62 g EDTA (39 wt %) to freeze toner particle growth. After freezing, the reaction mixture was heated to 85° C. and pH was reduced to 7.00 using a pH 5.7 acetic acid/sodium acetate (HAc/NaAc) buffer solution for coalescence. The toner slurry was cooled to RT, separated by sieving (25 mm), filtered, washed and freeze dried.

Example 3

Toner Made with Resin 2.9% Wax and 6.8% CPE

Into a 2 liter glass reactor equipped with an overhead mixer were added 260.56 g emulsion of resin 2 (23.35 wt %) prepared by a standard PIE process (particle size of 161.3 nm), 23.38 g CPE (35.60 wt %), 36.94 g IGI wax dispersion (29.97 wt %) and 48.09 g cyan pigment PB15:3 (14.96 wt %). Separately, 1.22 g $Al_2(SO_4)_3$ (27.85 wt %) were added in as flocculent under homogenization. The mixture was heated to 38.2° C. to aggregate the particles while stirring at 300 rpm. The particle size was monitored with a COULTER COUNTER until the core particles reached a volume average particle size of 4.54 µm with a $GSD_v$ of 1.25, and then 143.9 g of above mentioned resin 2 emulsion were added as shell material, resulting in core-shell structured particles with an average size of 6.48 µm, $GSD_v$ of 1.22. Thereafter, the pH of the reaction slurry then was increased to 7.8 using a 4 wt % NaOH solution followed by 4.62 g EDTA (39 wt %) to freeze toner particle growth. After freezing, the reaction mixture was heated to 85° C., and the pH was reduced to 7 using a pH 5.7 HAc/NaAc buffer solution for coalescence. The toner slurry was cooled to RT, separated by sieving (25 mm), filtered, washed and freeze dried.

Example 4

Fusing

All unfused images were generated using a DC12 copier (Xerox). A TMA (toner mass per unit area) of 1.00 mg/cm² was used for the amount of toner placed onto CXS paper (Color Xpressions Select, 90 gsm, uncoated, Xerox No. 3R11540) and used for gloss, crease and hot offset measurements. Gloss/crease targets were a square image placed in the centre of the page as known in the art. In general, two passes through the DC12 while adjusting developer bias voltage were required to achieve the desired TMA. The samples were fused offline with a Xerox fusing fixture supplied with a fresh fuser (Toshiba) roll and stripper fingers. A pressure roll and cleaning web having 100 Cs oil viscosity were supplied to the fixture and the fuser roll speed was set to 596 millimeters per second (mm/s). The fuser roll nip width was measured and determined to be 13.5+/−0.2 mm which gave a nip dwell time of 22.8 milliseconds (ms). The silicone oil rate was between 0.05 mg/copy to about 0.35 mg/copy. Nominal oil on copy in a machine running at 120 parts per minute (ppm) is about 0.05 mg/copy. One sheet at a nine was sent through the fuser and oil an copy for the first few sheets was usually greater than the running oil rate. During fusing, the set point temperature of the fuser roll was varied from cold offset, about 150° C., to hot offset, or up to about 210° C. After the set point temperature was changed, the fuser roll and pressure roll were allowed to reach equilibrium by waiting ten minutes before the unfused samples were sent through the fuser. Oil on copy sheets were retained at various fusing temperatures.

The hot offset of the toner from print to fuser roll was measured by setting the fuser roll temperature to 210° C. and, if required, the fuser roll temperature was lowered until hot offset was no longer observed. Generally, the procedure includes the following steps: (1) the cleaning web was removed from the fuser roll and fifteen sheets of paper were run through the fuser to reduce the amount of oil on the roll; (2) the cleaning web was placed back into the fuser and run for 60 seconds; and (3) the web was removed again, four sheets of paper, long edge feed, were sent through the fuser to reduce oil on the roll and an unfused sample was sent through the fuser followed by a blank (11 inches by 17 inches) sheet of paper. The blank sheet was examined carefully for signs of toner. Fusing properties are listed in Table 2.

TABLE 2

Fusing Properties of Bio-Based Toners

| Toner | Resin | Cold Offset | MFT | Hot Offset |
|---|---|---|---|---|
| | | | Fusing | |
| Control HMW | HMW | 117 | 118 | >200 |
| Control LMW | LMW | 120 | 113 | 165 |
| Example 3 (LMW) | Example 1 (LMW) | 113 | 117 | 155 |
| Example 2 (HMW) | Example 1 (HMW) | 123 | 124 | 210 |

The fusing results of both bio-toners indicated similar performance to commercially available HMW and LMW toners (Fuji Xerox).

Example 5

Electrical Properties

For each sample, about 50 g of toner were added to an SKM mill along with an additive package including silica, titania and zinc stearate, and then blended for about 30 sec at approximately 12500 rpm. Surface additives were 1.29% RY50L silica, 0.86% RX50 silica, 0.88% STT100H titania, 1.73% X24 sol-gel colloidal silica, and 0.2% PTFE particles, which were purchased from commercial vendors.

Toner charging results are collected for both the parent toner particle without any surface additives and for the blended toner particle with surface additives. In either case, a developer is prepared with 1.8 grams of toner and 30 g of XEROX®7556 carrier in a 60 mL glass bottle. After conditioning separate samples three days in a low-humidity zone (J zone) at 21.1° C. and 10% RH, and in a high humidity zone (A zone) at about 28° C/85% RH, the developers were charged in a Turbula mixer for 10 min where a sample is taken and for 60 minutes where another sample is taken.

The toner charge was measured in the form of q/d, the charge to diameter ratio. The q/d was measured using a charge spectrograph with a 100 V/cm field, and was measured visually as the midpoint of the toner charge distribution. The charge was reported in millimeters of displacement from the zero line (mm displacement can be converted to femtocoulombs/micron (fC/µm) by multiplying by 0.092).

The toner charge was also measured as the charge per mass ratio (q/m) was also determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio.

Compared to a control Xerox®700 Toner, both toners surprisingly had similar additive A-zone charge as the control toner despite the substantial change of reagents.

Overall, the thermal properties of the bioresins as well as the bench test fusing, blocking and electrical performance of the bio-based toners of interest are similar to the commercial bio-based toner.

It will be appreciated that various of the above-disclosed and other features and functions, or alternatives thereof, be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A toner particle comprising a bio-based polymer and a wax, wherein said bio-based polymer comprises (a) a rosin diol, (b) neopentyl glycol, (c) succinic acid, (d) an aromatic dicarboxylic acid and (e) dipropylene glycol or tripropylene glycol, wherein the rosin diol is a reaction product between a rosin acid and a cyclic alkylene glycol and comprises only one rosin moiety.

2. The toner particle of claim 1, further comprising a surface additive.

3. The toner particle of claim 1, wherein said rosin diol is selected from the group consisting of abietic-diol, palustric-diol, dehydroabietic-diol, neo-abietic-diol, levo-pimaric-diol, pimaric-diol, sandaracopimaric-diol, iso-pimaric-diol, hydrogenated abietic-diol, hydrogenated palustric-diol, hydrogenated dehydroabietic-diol, hydrogenated neo-abietic-diol, hydrogenated levo-pimaric-diol, hydrogenated pimaric-diol, hydrogenated sandaracopimaric-diol, and hydrogenated iso-pimaric-diol.

4. The toner particle of claim 1, wherein said polymer comprises a softening point of at least about 110° C.

5. The toner particle of claim 1, wherein said aromatic dicarboxylic acid is selected from the group consisting of phthalic acid, isophthalic acid and terephthalic acid.

6. The toner particle of claim 1, wherein said toner particle comprises an aggregated particle and a shell.

7. The toner particle of claim 6, wherein said shell comprises from about 1% to about 80% by weight of said toner particle.

8. The toner particle of claim 1, wherein said polymer comprises an acid value of at least about 10.

9. The toner particle of claim 1, wherein said polymer comprises a $T_g$ of at least about 50° C.

10. The toner particle of claim 1, comprising a lubricant.

11. The toner particle of claim 1, comprising a charge additive.

12. The particle of claim 1, comprising an additional resin.

13. The toner particle of claim 12, wherein said additional resin comprises an amorphous polyester resin.

14. The toner particle of claim 12, wherein said additional resin comprises an amorphous polyester resin and a crystalline resin.

15. The toner particle of claim 12, wherein said additional resin comprises a crystalline resin.

16. The particle of claim 12, wherein said additional resin comprises poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid) or combinations thereof.

17. The particle of claim 1, comprising a colorant.

18. The particle of claim 1, which is an emulsion aggregation toner.

19. A developer comprising the particle of claim 1.

20. The developer of claim 19, comprising a carrier.

* * * * *